United States Patent
Garner et al.

(10) Patent No.: US 8,768,128 B1
(45) Date of Patent: Jul. 1, 2014

(54) COLOR CODED OPTICAL FIBERS

(71) Applicant: OFS Fitel, LLC, Norcross, GA (US)

(72) Inventors: Harry D Garner, Lawrenceville, GA (US); Jonathan M Jobe, Decatur, GA (US); Kariofilis Konstadinidis, Decatur, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/746,538

(22) Filed: Jan. 22, 2013

(51) Int. Cl.
*G02B 6/02* (2006.01)

(52) U.S. Cl.
USPC ........... 385/123; 385/124; 385/125; 385/141; 385/144; 65/376; 65/385; 65/411

(58) Field of Classification Search
USPC ............ 385/123, 124, 125, 141, 144; 65/376, 65/385, 411
See application file for complete search history.

(56) References Cited

U.S. PATENT DOCUMENTS 6,994,719 B2 * 2/2006 Grafton .......................... 606/228
7,832,234 B2 * 11/2010 Hoppe et al. .................... 65/33.2

* cited by examiner

*Primary Examiner* — Jennifer Doan

(57) ABSTRACT

The specification describes an optical fiber color coding scheme that uses two colors, where each of the two colors constitutes one half of the surface of the optical fiber coating. If a longitudinal portion of the coating is considered a hollow cylinder, then each of the two colors is a hollow hemi-cylinder. To ensure that each of the two colors is always plainly visible to an installer, the two colors are formed with a twist. Using two colors for coding substantially increases the number of available unique color codes. Coloring the entire coating reduces the chances of error in identifying the optical fibers.

6 Claims, 2 Drawing Sheets

COLOR CODED OPTICAL FIBERS

FIELD OF THE INVENTION

This invention relates to color coding optical fibers with two color coding.

BACKGROUND OF THE INVENTION

Color coding of optical fibers is well known and widely used. The standard colors for optical fibers follow the traditional standard for electrical wire, namely:

| Fiber Number | Color |
| --- | --- |
| 1 | Blue |
| 2 | Orange |
| 3 | Green |
| 4 | Brown |
| 5 | Slate |
| 6 | White |
| 7 | Red |
| 8 | Black |
| 9 | Yellow |
| 10 | Violet |
| 11 | Rose |
| 12 | Aqua | where white and black are considered colors for the purpose of this description. As is evident, this group of colors allows effective coding for twelve optical fibers in an optical fiber cable. However, high fiber count cables in commercial use often have more than twelve optical fibers, often many more.

To overcome this limitation, use of multiple colors has been proposed. One such proposal is described in U.S. Pat. No. 6,317,553. This patent describes, inter alia, the use of a continuous thin color stripe extending along the length of the optical fiber. With a background color and the stripe color, and the color options in Table 1, it is possible to have 66 color combinations.

In some applications, particularly field applications, the working conditions are such that it may be difficult to discriminate these color combinations, especially to identify the color of the thin stripe.

SUMMARY OF THE INVENTION

We have designed a color coding scheme that uses two colors, where each of the two colors constitutes approximately one half of the surface of the optical fiber coating. If a longitudinal portion of the coating is considered a hollow cylinder, then each of the two colors is a hollow hemi-cylinder. To is ensure that each of the two colors is always plainly visible to an installer, the two colors are formed with a twist. The resulting optical fiber may be referred to below as a hemi-twist optical fiber. Using two colors for coding substantially increases the number of available unique color codes.

Figure 1:
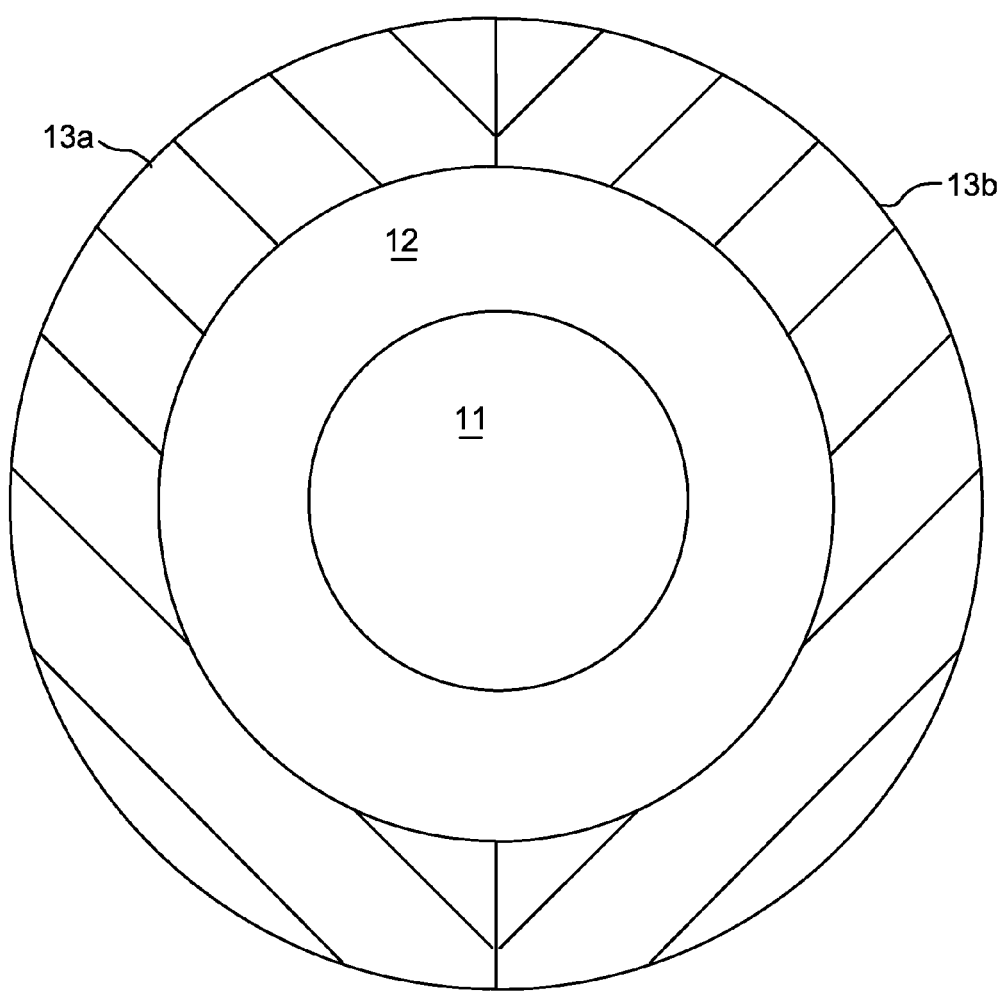
FIG. 1 is a cross section of a hemi-twist optical fiber according to the invention.

The figures in the drawing are not to scale.

DETAILED DESCRIPTION

Referring to FIG. 1, an optical fiber is shown color coded according to the invention. FIG. 1 is a sectional view transverse to the length of the optical fiber. The light waveguide portion of the optical fiber is shown at 11. Typically the waveguide is a glass core surrounded by a glass cladding. Plastic optical fibers may also be used in some applications. The term optical fiber is intended to mean a glass or plastic lightwave transmission medium and a protective coating surrounding the light transmission medium. The invention described here relates mainly to the protective coating of the optical fiber.

Optical fiber coatings are polymers that are extruded onto the fiber waveguide as it is drawn from an optical fiber preform. Since the fiber waveguide is fragile, the protective coating is always applied as the fiber waveguide is formed.

Optical fiber coatings may be a single layer or, more typically, are two or more layers applied in tandem to the drawn optical fiber. These options, and optical fiber coating methods in general, are well known.

Figure 3:
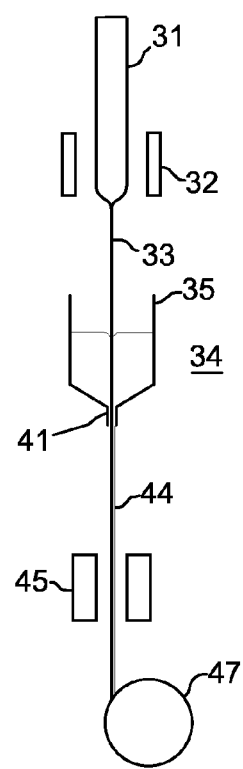
FIG. 3 is a schematic representation of an optical fiber draw apparatus useful for applying color coatings according to the invention.

Optical fibers are drawn from a preform. FIG. 3 shows an optical fiber drawing apparatus with preform 31, and susceptor 32 representing the furnace (not shown) used to soften the glass preform and initiate fiber draw. The drawn fiber is shown at 33. The nascent fiber surface is then passed through a coating cup or enclosure, indicated generally at 34, which has a chamber 35 containing a coating prepolymer. For multiple coating, more than one coating apparatus is used, arranged in tandem with the other(s). Multiple coatings can also be applied wet-on-wet in a single applicator. When applying multiple colors, the cup or enclosure may be split to accommodate two prepolymers, each having a different color. The liquid coated fiber from the coating chamber exits through die 41. The combination of die 41 and the fluid dynamics of the prepolymer, controls the coating thickness. The prepolymer coated fiber 44 is then exposed to UV lamps 45 to cure the prepolymer and complete the coating process. Other curing radiation may be used where appropriate. The fiber, with the coating cured, is then taken up by take-up reel 47. The take-up reel controls the draw speed of the fiber. Draw speeds in the range typically of 1-100 m/sec. can be used. It is important that the fiber be centered within the coating cup, and particularly within the exit die 41, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus in FIG. 3 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating typically ranges from 150-300 μm in diameter, with approximately 240 μm standard. Tertiary coatings may also be used.

For color coding, a color additive is mixed with the prepolymer. It may be mixed with the prepolymer of the primary coating, or, as generally preferred, a secondary or tertiary prepolymer. Recognizing that typical cured polymer optical fiber coatings may be transparent, the color coded coating may be a primary coating of a dual coated optical fiber, or a secondary coating of a tertiary coated optical fiber. For two color coding, according to the invention, a split applicator cup may be used. The applicator cup may be provided with a dam separating the cup into two halves, with each half containing a prepolymer with a different color. In a convenient arrangement, the secondary die may be provided with two feed ports 180 degrees apart, with an independent prepolymer supply for each port.

While in some applications it may be preferred to form the color coded coating as part of the optical fiber draw process the color coded coating may also be applied in a separate operation, after the initial optical fiber, with one or two protective coating is already drawn in the conventional way. Using this option, the drawn and coated optical fiber is passed through an additional coating apparatus, where the two color coating is applied as a secondary or tertiary coating. A typical thickness for the separate two color coating may be in the range of 2-20 micrometers.

Referring back to FIG. 1, a dual layer coating is shown with primary coating 12, and a secondary coating surrounding the primary coating. According to the invention, the secondary coating has two color coded sections, 13a of one color, and 13b of another color. When the coating is viewed in a sectional view transverse to the length of the optical fiber, the view shown in FIG. 1, each of the two coded sections extends around 180 degrees of the coating circumference. The generic shape of each of the sections 13a and 13b is not commonly defined, but if a longitudinal portion of the coating is considered a hollow cylinder, then each of the two color coded sections may be defined as a hollow hemi-cylinder.

As mentioned earlier, the use of two colors for coding the optical fibers allows a significant increase in the number of unique color codings available to identify the optical fibers. For example, using eight common colors there are 28 unique color combinations using two colors. This is illustrated in the following table.

TABLE I

| SINGLE COLOR (8) | TWO COLORS (28) |
| --- | --- |
| white | white/black |
| red | white/violet |
| orange | white/green |
| yellow | white/blue |
| blue | white/yellow |
| green | white/orange |
| violet | white/red |
| black | red/orange |
| | red/yellow |
| | red/blue |
| | red/green |
| | red/violet |
| | red/black |
| | orange/yellow |
| | orange/blue |
| | orange/green |
| | orange/violet |
| | orange/black |
| | yellow/blue |
| | yellow/green |
| | yellow/violet |
| | yellow/black |
| | blue/green |
| | blue/violet |
| | blue/black |
| | green/violet |
| | green/black |
| | violet/black |

A known industry standard for color coding optical fibers has 12 different colors. Using that range of individual colors in the two color coding of the invention results in 66 possible unique color combinations. Obviously fewer, or more, colors and color combinations are within the contemplation of the invention.

Figure 2:
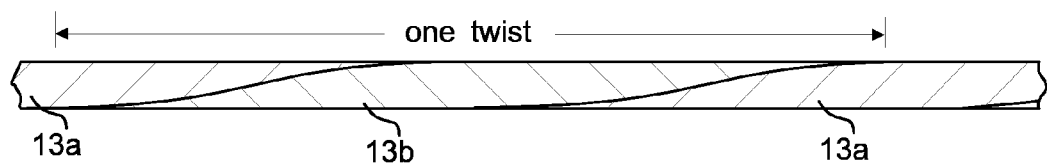
FIG. 2 is a longitudinal view of the optical fiber of FIG. 1 taken along the length of the hemi-twist optical fiber.

It will be appreciated by those skilled in the art that color coded optical fibers of the invention are more easily identified than optical fibers using thin color stripes for coding. This result is important for installers to be able to properly identify individual optical fibers in a high fiber count cable. It is especially the case in field installations where splicing or connecting optical fibers may occur under hostile conditions, or in conditions of low light. In most optical fiber installations, an optical fiber cable end, or an intermediate point where a cable is installed or being installed, a small length of the cable jacket is removed, exposing a few to several inches or more of optical fiber. It is possible that the optical fiber will be oriented such that only half of the optical fiber coating is easily visible. In that case it is possible for most of the color seen by the installer to be a single color, and the second color of the two color coding not clearly identified. To overcome that possibility, the optical fiber may be twisted during draw. That results in a twist in the two color coating as it is applied. This is shown in FIG. 2, where a portion of a two color coded optical fiber of FIG. 1 is shown with one full twist. The figure is not to scale, with the diameter of the optical fiber exaggerated for clarity. To ensure proper optical fiber identification under most likely conditions experienced in a typical installation it is recommended that the two color coded optical fiber have at least one full twist per meter. A twisted optical fiber with a two color hollow hemi-cylinder coating, as described herein, may be referred to as a hemi-twist optical fiber.

Examples of suitable optical fiber twist patterns are S-Z twist, which can be done by spinning the fiber or the die, or S twist, which results from spinning the die of the draw apparatus.

In summary, a hemi-twist color coded optical fiber according to the invention comprises an optical fiber light waveguide having an elongated polymer coating. The elongated polymer coating has, along any extended portion of the coating, a transverse section that is round. The hemi-twist optical fiber also has, along any extended portion of the coating, a longitudinal section comprising a hollow cylinder shape and when divided in half forms a first hollow hemi-cylinder portion and a second hollow hemi-cylinder portion. According to a main aspect of the invention the first hollow hemi-cylinder portion has a color different from the second hollow hemi-cylinder portion. The limitation "along any extended portion" means a length along the optical fiber of at least a meter. In preferred embodiments the meter length of the optical fiber comprises one or more twists.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. A hemi-twist color coded optical fiber comprising:
   an optical fiber light waveguide,
   an elongated polymer coating covering the optical fiber light waveguide,
   the elongated polymer coating having, along any extended portion of the elongated polymer coating, a transverse section that is round and having, along any extended portion of the elongated polymer coating, a longitudinal section comprising a hollow cylinder shape and divided in half to form a first hollow hemi-cylinder coating portion and a second hollow hemi-cylinder coating portion, with the first hollow hemi-cylinder coating portion having a color different from the second hollow hemi-cylinder coating portion.

2. The hemi-twist color coded optical fiber of claim 1 wherein the optical fiber and the polymer coating are twisted along the length of the optical fiber.

3. The hemi-twist color coded optical fiber of claim 2 wherein the optical fiber and the polymer coating are twisted at least one twist per meter along the length of the optical fiber.

4. The hemi-twist color coded optical fiber of claim 1 wherein the color coded polymer comprises a primary coating of the optical fiber.

5. The hemi-twist color coded optical fiber of claim 1 wherein the color coded polymer comprises a secondary coating of the optical fiber.

6. The hemi-twist color coded optical fiber of claim 1 wherein the color coded polymer comprises a tertiary coating of the optical fiber.

* * * * *